(12) United States Patent
Redmann

(10) Patent No.: US 9,681,113 B2
(45) Date of Patent: Jun. 13, 2017

(54) METHOD AND SYSTEM OF USING FLOATING WINDOW IN THREE-DIMENSIONAL (3D) PRESENTATION

(75) Inventor: William Gibbens Redmann, Glendale, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 330 days.

(21) Appl. No.: 13/635,007

(22) PCT Filed: Apr. 1, 2011

(86) PCT No.: PCT/US2011/000589
§ 371 (c)(1),
(2), (4) Date: Sep. 14, 2012

(87) PCT Pub. No.: WO2011/123177
PCT Pub. Date: Oct. 6, 2011

(65) Prior Publication Data
US 2013/0010093 A1  Jan. 10, 2013

Related U.S. Application Data

(60) Provisional application No. 61/319,972, filed on Apr. 1, 2010.

(51) Int. Cl.
*H04N 13/02* (2006.01)
*H04N 13/00* (2006.01)

(52) U.S. Cl.
CPC ..... *H04N 13/0018* (2013.01); *H04N 13/0022* (2013.01)

(58) Field of Classification Search
CPC .... H04N 19/597; H04N 13/00; H04N 13/004; H04N 13/007; H04N 13/0018;
(Continued)

(56) References Cited

U.S. PATENT DOCUMENTS 5,691,843 A * 11/1997 O'Neill ................. G02B 27/26
                                                  359/462
5,847,870 A    12/1998 Ohtsuka
(Continued)

FOREIGN PATENT DOCUMENTS

JP        05-316541     11/1993
JP         0865715       3/1996
(Continued)

OTHER PUBLICATIONS

Search report mailed Jul. 1, 2011.

*Primary Examiner* — Nathnael Aynalem
(74) *Attorney, Agent, or Firm* — Brian J. Dorini; Lily Neff

(57) ABSTRACT

A method and system for presenting stereoscopic images are described, in which a portion of at least one stereoscopic image of a stereoscopic pair is blocked while displaying the stereoscopic images. The blocked portion has a width at least equal to a magnitude of a minimum disparity associated with a region of the image near a vertical edge of the image or near a vertical edge of an area for displaying the image. By blocking the portion of the image during content display, one can avoid depth cue conflicts near the edge of the images or the display area.

18 Claims, 16 Drawing Sheets

(58) Field of Classification Search
CPC ........... H04N 13/0011; H04N 13/0022; H04N 13/0033; H04N 13/0239; H04N 13/0275; H04N 13/0285; H04N 13/044; H04N 21/4318; H04N 13/0497; H04N 2013/0081; H04N 2013/0085; H04N 2013/0092; H04N 2213/002; G02B 27/2228; G02B 27/2221; G06T 2207/10012; G06T 7/593; G06T 7/97
USPC ................ 348/154, 345, 42, 46, 51, 59, 54; 345/419; 349/15; 359/464; 396/324
See application file for complete search history.

(56) References Cited

U.S. PATENT DOCUMENTS

| | | | | |
|---|---|---|---|---|
| 6,301,446 | B1 * | 10/2001 | Inaba | G03B 35/10 396/324 |
| 8,400,496 | B2 * | 3/2013 | Robinson | G09G 3/003 345/422 |
| 8,587,638 | B2 * | 11/2013 | Pockett | H04N 13/0018 348/51 |
| 9,251,621 | B2 * | 2/2016 | Robinson | G06T 15/20 |
| 2001/0030715 | A1 * | 10/2001 | Tabata | G02B 27/0172 349/15 |
| 2002/0141635 | A1 * | 10/2002 | Swift | G06T 7/0022 382/154 |
| 2005/0195477 | A1 | 9/2005 | Kornfeld | |
| 2008/0240549 | A1 * | 10/2008 | Koo | H04N 13/0018 382/154 |
| 2009/0160931 | A1 * | 6/2009 | Pockett | H04N 13/0018 348/42 |
| 2010/0091097 | A1 * | 4/2010 | Pockett | 348/54 |
| 2011/0013890 | A1 * | 1/2011 | Sasaki | G11B 27/105 386/357 |
| 2011/0234760 | A1 * | 9/2011 | Yang | H04N 13/0048 348/46 |

FOREIGN PATENT DOCUMENTS

| | | |
|---|---|---|
| JP | 08234140 | 9/1996 |
| WO | WO2008038068 | 4/2008 |

\* cited by examiner

METHOD AND SYSTEM OF USING FLOATING WINDOW IN THREE-DIMENSIONAL (3D) PRESENTATION

CROSS-REFERENCE TO RELATED APPLICATION

This application claims the benefit, under 35 U.S.C. §365 of International Application PCT/US2011/000589 filed Apr. 1, 2011 which was published in accordance with PCT Article 21(2) on Oct. 6, 2011 in English and which claims the benefit of U.S. Provisional Patent Application No. 61/319,972 filed on Apr. 1, 2010.

TECHNICAL FIELD

The present invention relates to preparing images for use in a stereoscopic presentation.

BACKGROUND

In a stereoscopic three-dimensional (3D) presentation, both in movies and still photography, it is a common practice to crop right- and/or left-eye image at the corresponding right- or left-eye edge, if an object that is supposed to appear in front of the screen or photograph touches that edge. This practice, which is meant to avoid depth conflicts in viewing the object, is usually called a floating window or floating edge, and is manually set.

However, when actually presented in a theatrical environment, the masking on either side of a screen may impinge on or mask the region in which a floating edge was to be displayed, thus destroying the purpose of adding the floating edge. The same situation can arise in a 3D video display, if a monitor is displaying an image less than the full raster of the original image content.

The restoration of the floating edge in the display environment or device must take into account the underlying image so that the floating edge does not impinge on foreground elements of the content. However, in a theatrical environment or for an individual 3D video display, a professionally set floating window adjustment is not practical, and these situations require automatic floating edge (or floating window) creation and/or adjustment.

SUMMARY OF THE INVENTION

Embodiments of the present principles provide a method and system for stereoscopic presentation, in which a portion of at least one stereoscopic image of a stereoscopic pair is blocked while displaying the stereoscopic images. By providing the blocked portion with a width based on a minimum disparity associated with a region of the image, apparent depth conflicts near the edge of the images or display area can be avoided.

One embodiment provides a method that includes obtaining a minimum disparity associated with a region of a first stereoscopic image, defining a portion of the first stereoscopic image proximate to the region in accordance with the minimum disparity, and displaying the first stereoscopic image while blocking the defined portion from being displayed.

Another embodiment provides a method that includes: determining an apparent depth of an object in a region of a stereoscopic image proximate an edge of an image display area, and blocking a portion of the stereoscopic image from being displayed, in which the portion has a width selected based on the apparent depth of the object.

Yet another embodiment provides a system that includes at least one processor configured for determining a minimum disparity associated with a region of a first stereoscopic image, defining a portion of the first stereoscopic image proximate to the region in accordance with the minimum disparity, and blocking the defined portion during display of the first stereoscopic image.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
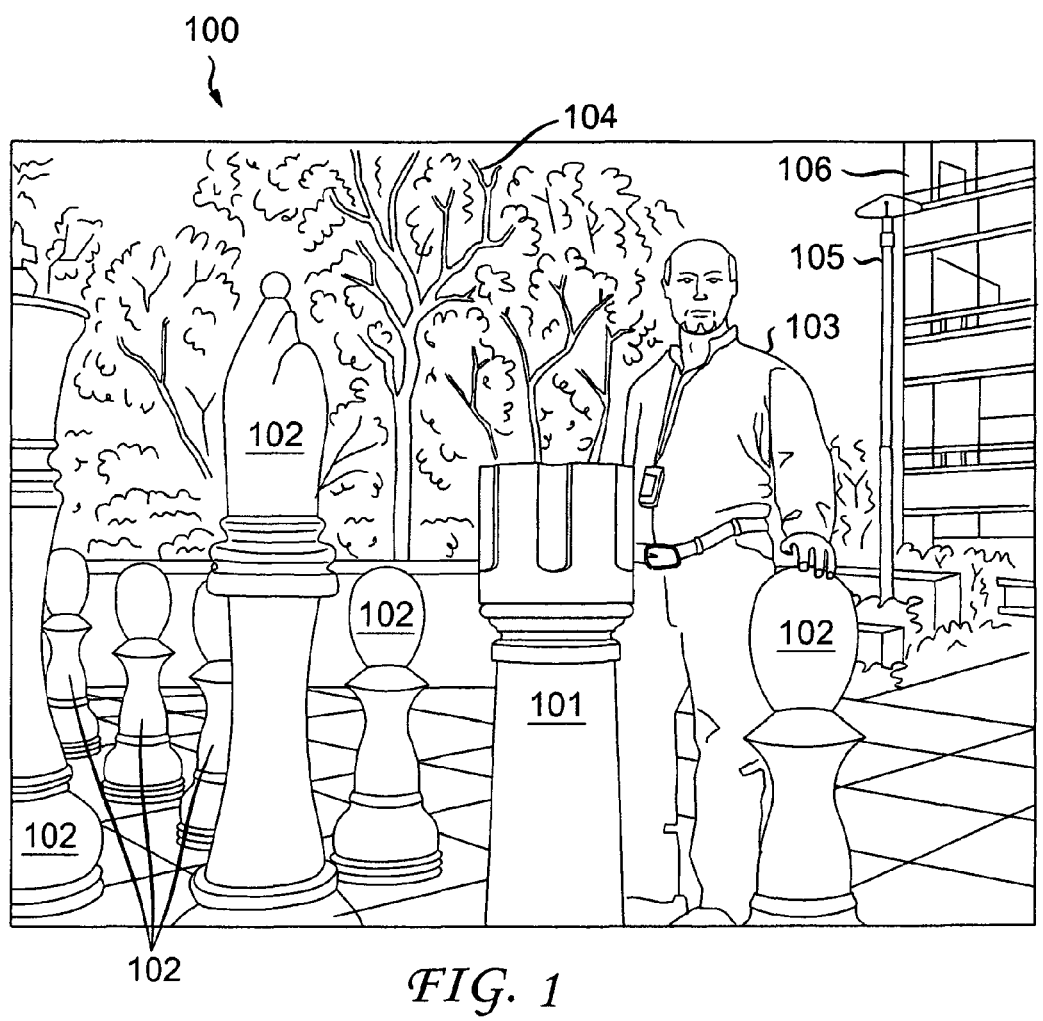
FIG. 1 shows an example of a scene in a presentation.

According to embodiments of the present principles, 3D presentation (whether in digital cinema or video) is implemented in which a floating window or mask can be dynamically applied during content presentation to relieve the effect where near-edge objects intended to appear in front of the screen are clamped back to the screen surface by the real position of the screen's edge. Several modes of floating window or floating edge can be selected, including, for example, using metadata to provide information of the floating edge, dynamically rendering the floating edge in real-time or having it pre-recorded in the stereoscopic images, and providing floating edges with different characteristics or dimensions.

Rendering floating edges in real-time has an advantage over the pre-recorded approach because the content can be viewed in 2D by using only a single-eye image view (e.g., showing only the left-eye images), whereas 2D viewing of content with pre-recorded floating edges can result in arbitrary edge undulations that are distractive to the viewers.

In this disclosure, the terms "floating window" and "floating edge" are used to describe the cropping of the left- and/or right-eye image of a stereoscopic pair at the corresponding left and/or right edge. The purpose of such cropping is to reduce or eliminate the psycho-visual conflict that occurs for a viewer when a "foreground object" intersects one or both side (e.g., vertical) edges of the screen (i.e., the image of the object extends beyond the side edge of the screen). In this discussion, the term "foreground object" means an object having a negative disparity within the stereoscopic image, i.e., an object that should have an apparent depth location between the screen and the viewer. The term "apparent depth" is the depth perception by a viewer relative to the screen, caused by the disparity between the left-eye and right-eye images. Disparity and apparent depth are related quantities that can be converted from one to the other. A 3D presentation is usually constrained to provide apparent depth because viewers at different locations will perceive a different apparent depth for the same element in the image. The psycho-visual conflict occurs because the image of the object is partially obscured by the edge of the visible screen, and the edge of the visible screen has an actual depth location behind the object.

Obscuration is a strong visual cue for depth ordering. An object closer to a viewer can hide an object further from the viewer. In most situations, obscuration is a stronger visual cue for depth ordering than is binocular disparity. As a result, although the disparity of the object in the image suggests it is a foreground object, the cues at the screen's edge will contradict and override this, causing the apparent position of the object to collapse back to the screen. If the collapsed foreground object itself partially obscures other foreground objects, the resulting can be a cascade of visual depth cue contradictions.

The result of such contradictions is that viewing a stereoscopic presentation ceases to be an intuitive activity in which the viewer enjoys content with a richness of perceived depth, but instead becomes a confusion-inducing visual puzzle, with some objects apparently appearing behind others that they are in front of. This distracts the viewer from the story being told, thereby detracting from the content.

The present principles can be used in digital cinema theatre equipment and video equipment, such as head-end broadcast or streaming system as well as consumer-side equipment, including television monitors, set-top boxes, DVD players, video recorders, personal computers, handheld displays such as those on video players or smart phones, and other mobile or portable devices.

Embodiments of the present invention provide for the automatic application and/or adjustment of floating edges, taking into account of intrusions at the specific display environment or device that reduce the viewable area of a display and cause undesirable effects such as conflicts in depth perception in the displayed images. Thus, for a given image display area or system configuration (e.g., as defined by masking, image resizing or system-related arrangements), the present invention allows appropriate floating edges to be automatically added and/or adjusted in position so as to provide a display with improved aesthetics. Furthermore, if a foreground object becomes completely hidden by the intrusion, any floating edge previously established to avoid depth cue conflicts with that object may be removed or reduced.

There are many possible sources of intrusions or system configurations that can interfere with a proper stereoscopic display. For example, in a theatre, a projector may overshoot the bounds of the screen as a result of curvature of the screen, angle of projection, non-ideal lens size or adjustment, so that the image space is effectively reduced. Screen masking or curtains may intrude on the usable area of the projection screen, or may trim a keystoned image into a more aesthetic rectangle.

In another example, a home monitor, such as a big screen television set, may over-scan an image (to display a subset of the image on the full screen), for example to avoid displaying the edges of the content or present high-resolution content without rescaling. In some modes, an individual monitor might expand a picture having an aspect ratio different than the monitor itself, for instance if a HD (high definition) monitor with an aspect ratio of 16:9 receives a SD (standard definition) program with an aspect ratio of 4:3, with the result that a certain portion of the image gets cropped off. Such interference or obstructions to proper applications of floating edges can be avoided by adjusting the placement of floating edges according to embodiments of the present invention. Furthermore, there are certain situations where, even if the image is not over-scanned (e.g., image is only stretched or expanded horizontally, or the vertical stretch does not exceed the monitor height), the use of floating edges according to the present principles can still be beneficial.

A floating edge may be specified as a rectangular box spanning the entire left or right vertical edge, from top to bottom, of the corresponding left- or right-eye image of a stereoscopic image pair. The rectangle should be at least as wide as the magnitude of the disparity of the foremost foreground object being cropped at the image edge, e.g., by a side masking. Furthermore, if a foreground object in the image appears to intersect the edge (e.g., when only a portion of the object is actually present in the image), then a floating edge according to the present invention can also be use to avoid possible depth cue conflicts. For example, at the left edge of a stereoscopic image pair, the disparity is the horizontal disparity or offset between the leftmost pixel in the right-eye image representing a point on a foreground object and the pixel representing the same point on the same object in the left-eye image.

Alternatively, a floating edge may be some other regular or arbitrary shape, perhaps addressing as little as the vertical region along an edge where a foreground object crosses or appears to intersect the edge of the image. The width of such a floating edge may be constant along the vertical direction, or may vary with each row of pixels, with the width of the floating edge at each row always being at least equal to the disparity of the corresponding foreground object at that edge, in that row. Thus, a floating edge may be discontinuous, e.g., that it can have one or more rows of pixels with zero width.

A stereoscopic image pair can be presented without any floating edges, or it can be enhanced or complemented by at least one floating edge, e.g., a left floating edge, a right floating edge, or both. (The image being "enhanced" or "complemented" by a floating edge means that the floating edge is incorporated or displayed along with the image.) A floating edge may come and go gradually, anticipating the appearance or movement of foreground objects, or may appear or vanish suddenly, with the specific selection being based on artistic decisions.

To set the context of the later figures, FIG. 1 shows a representative scene from a presentation, e.g., a scene in a garden in which the subsequent shots discussed below are made. Garden scene 100 shows an actor 103 standing amidst an set of garden size chess pieces 102, including one particular chess piece, a rook 101, in the foreground. Behind actor 103 there is a tree 104. About the same distance back, but off to right side is lamp 105, and further still is building 106. The shots of garden scene 100 shown in FIG. 2-13 are taken from positions slightly to the right of the vantage point represented in FIG. 1.

Figure 2:
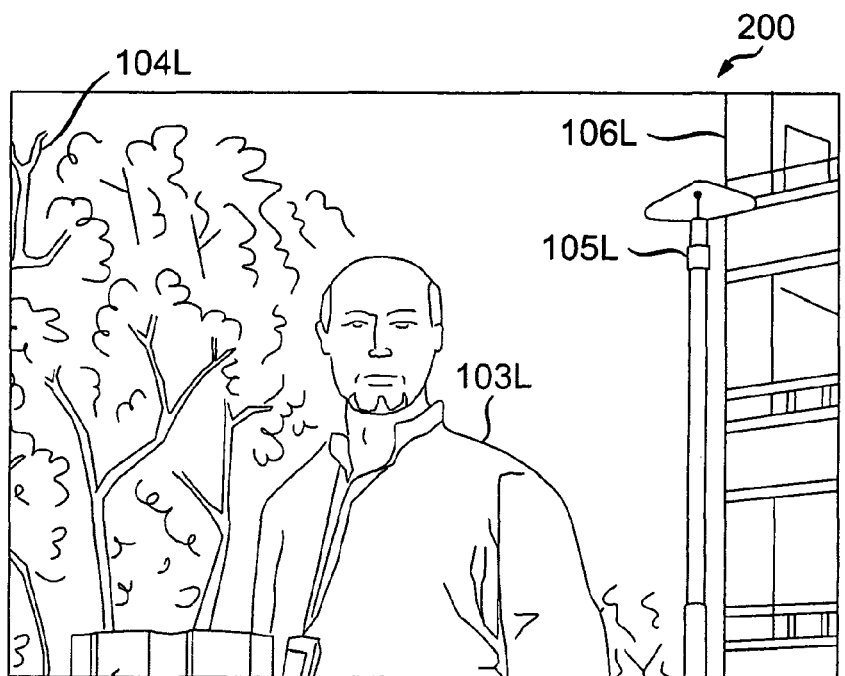
FIG. 2 shows a left-eye view of a 3D shot or composition in the scene of FIG. 1.
Figure 3:
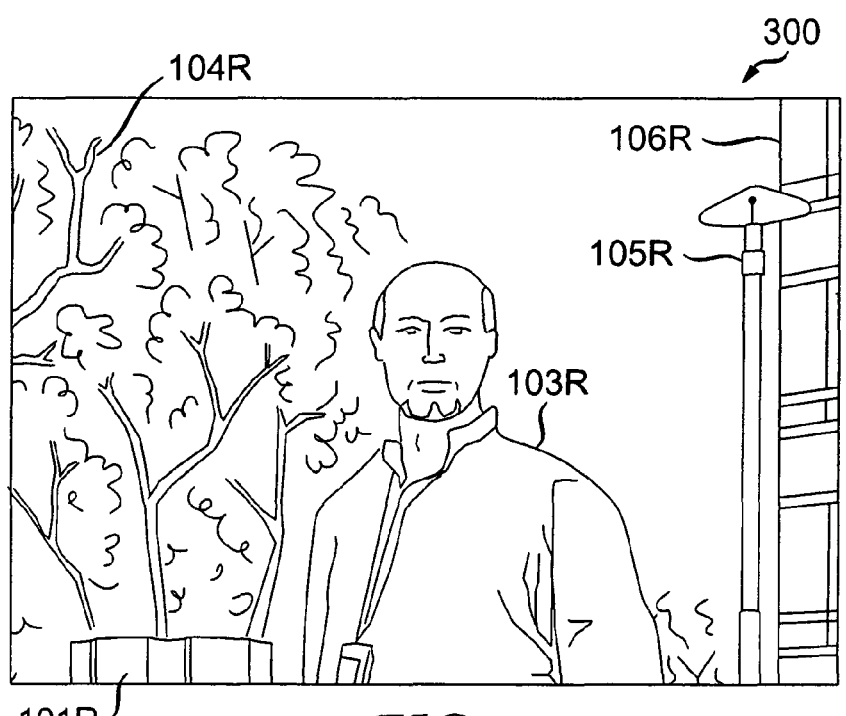
FIG. 3 shows a right-eye view of a 3D shot in or composition in the scene of FIG. 1.

FIGS. 2 and 3 represent a stereoscopic image pair of a shot or composition from garden scene 100, with FIG. 2 showing the left-eye image 200, and FIG. 3 showing right-eye image 300. Each image 200 or 300 includes recorded images of individual objects from garden scene 100 so that each object in the garden scene has a corresponding recorded image in the right- and left-eye images 200 and 300. To avoid potential confusion between images of objects from the scene 100 and stereoscopic images 200 and 300, the stereoscopic images may also be referred to as left- and right-eye compositions 200 and 300. Thus, actor 103 has corresponding images 103L and 103R, rook 101 has corresponding images 101L and 101R, tree 104 has corresponding images 104L and 104R, lamp 105 has corresponding images 105L and 105R, and building 106 has corresponding images 106L and 106R.

Figure 4:
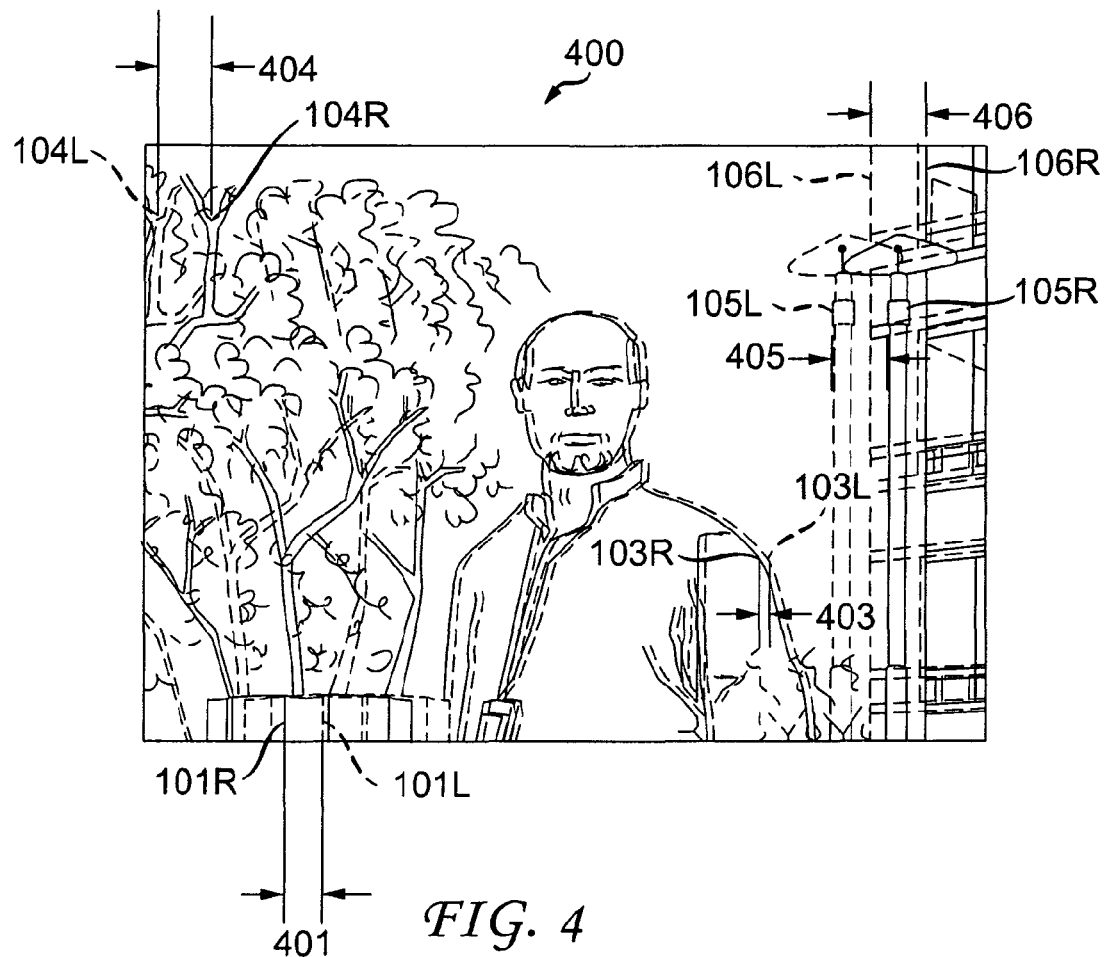
FIG. 4 shows a stereoscopic image view formed by superimposed left- and right-eye images of FIG. 2-3.

FIG. 4 is a superposition of images 200 and 300, in which the left-eye image 200 is shown as dotted lines so that stereoscopic disparities or positional offsets between the right- and left-eye images (200, 300) can be shown.

Several disparities are illustrated in FIG. 4. For example, rook disparity 401 associated with rook 101 (e.g., measured as a separation between corresponding vertical edges of right- and left-rook images 101R and 101L), is about −40 pixels horizontally—with the measurement being positive when the right-eye image is to the right of the left-eye image. In the case of rook 101, since the right-eye image 101R is located to the left of the left-eye image 101L, the eyes of a viewer focusing on rook 101 would converge in front of a display (or screen or monitor) showing this stereoscopic pair, i.e., rook 101 would appear to be in front of the display.

The actor disparity 403 is about −5 pixels, as measured at his sleeve, which is slightly in front of the plane of the screen. Tree images 104L and 104R exhibit a disparity 404 of about +40 pixels, with the right-eye image 104R being to the right of left-eye image 104L. Thus, the tree 104 will appear to a viewer to be behind the display or screen. Lamp 105 appears with disparity 405 of about +45 pixels between images 105L and 105R, and building 106 appears with disparity 406 of about +60 pixels between 106L and 106R, each appearing still farther away than the tree 104.

Figure 5:
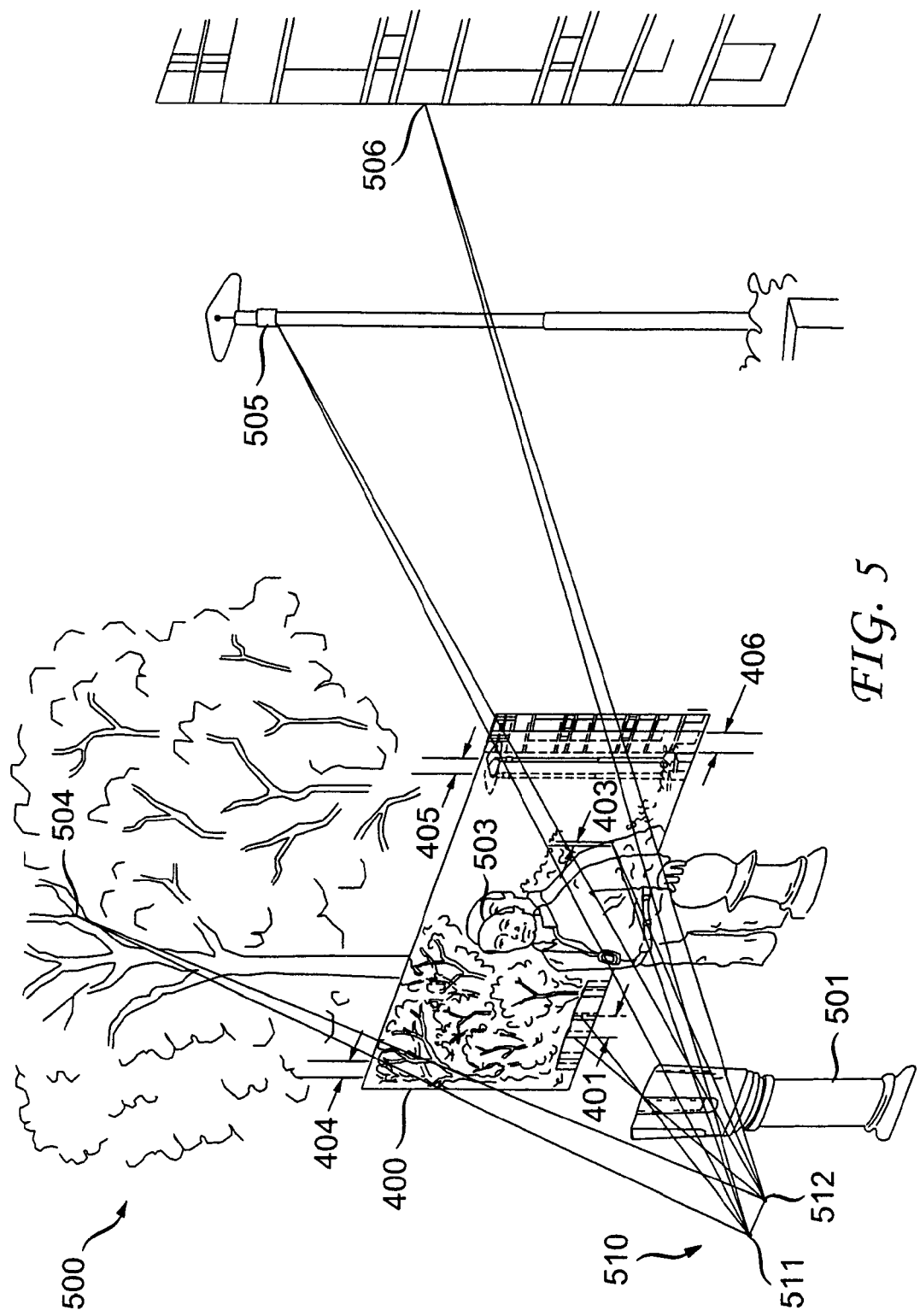
FIG. 5 shows an imaginary view of 3D perceived from stereoscopic image.

FIG. 5 is an imaginary view 500 of the perceived 3D effect for viewer 510 having left-eye 511 and right-eye 512 viewing stereoscopic image 400. (FIG. 5 is referred to as imaginary because this view cannot actually be observed from this vantage point.) For viewer 510, the stereoscopic rook disparity 401 results in a perception of rook image 501 in front of the screen showing stereoscopic image 400. Actor image 503 (with offset or disparity 403) is slightly in front of the screen. Tree disparity 404, lamp disparity 405, and building disparity 406 each produces a perception of the corresponding images 504, 505, and 506 being at increasing distances behind the screen.

Although the images corresponding to different objects are shown as planar in FIG. 5, in practice, viewer 510 would perceive the object images 501, 503, 504, 505 and 506 as 3D, at various distances corresponding to the respective disparities. FIG. 5 shows the perceived 3D locations for objects with respective disparities 401, 403, 404, 405 and 406 (see also FIG. 4). Each object's perceived location is indicated by an intersection of respective rays traced from left-eye 511 and right-eye 512 through the reference point (at which disparity is measured for a given object).

Different scenarios and approaches for using floating windows or edges for stereoscopic presentations according to embodiments of the present invention are discussed by reference to FIGS. 6-17.

Figure 6:
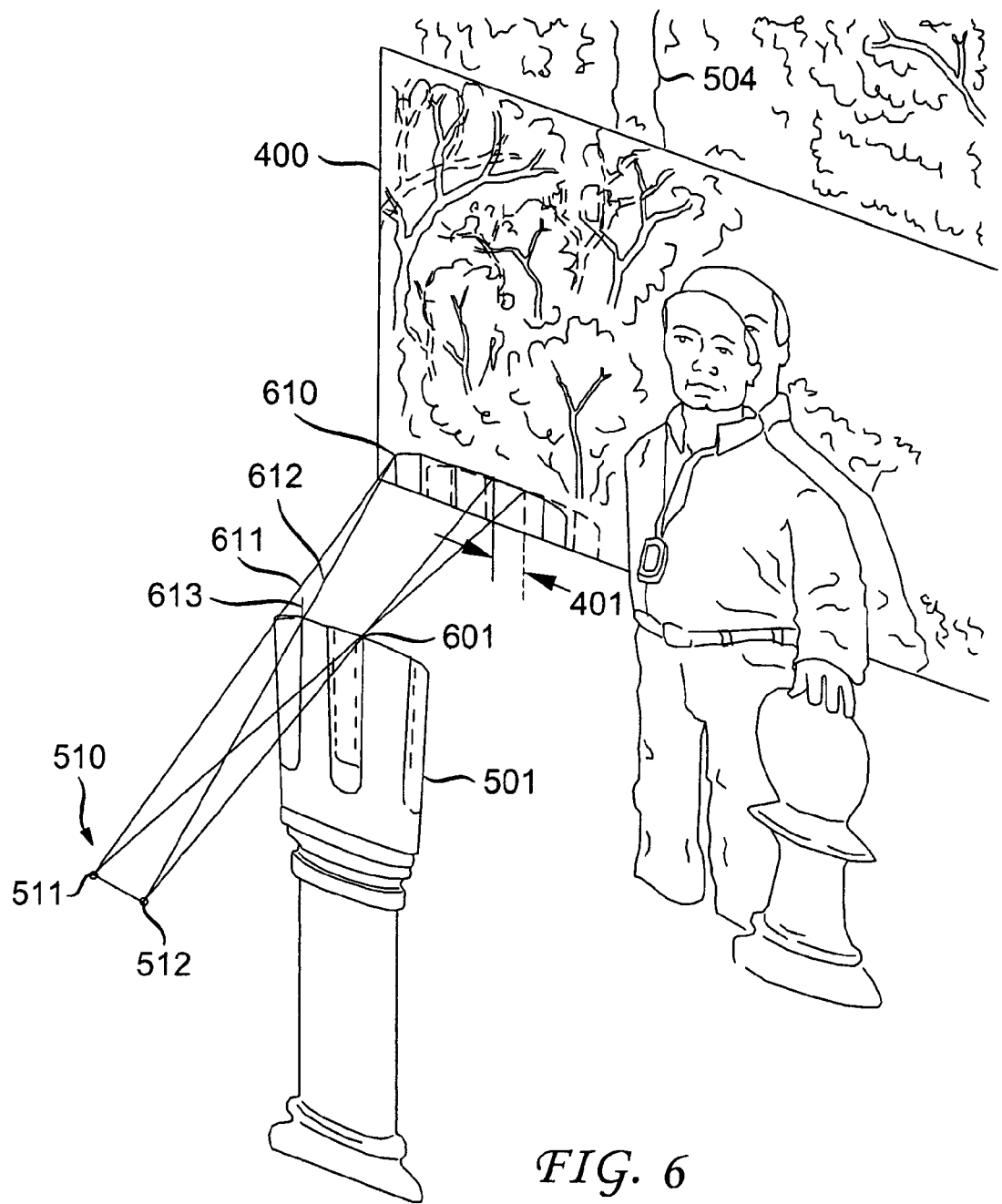
FIG. 6 shows an imaginary view showing a visual depth conflict.

FIG. 6 shows a close up of the imaginary view 500 with left- and right-eye sight lines 611 and 612 added to show a visual contradiction. For right eye 512, vertical edge 610 of screen occludes visibility of rook image 501 to the left of occlusion line 613. This gives the perception that rook image 501 is behind the edge 610 of the screen. However, because of disparity 401 (being a negative quantity), rook image 501 appears to be in front of the screen at stereoscopic convergence point 601.

Figure 7:
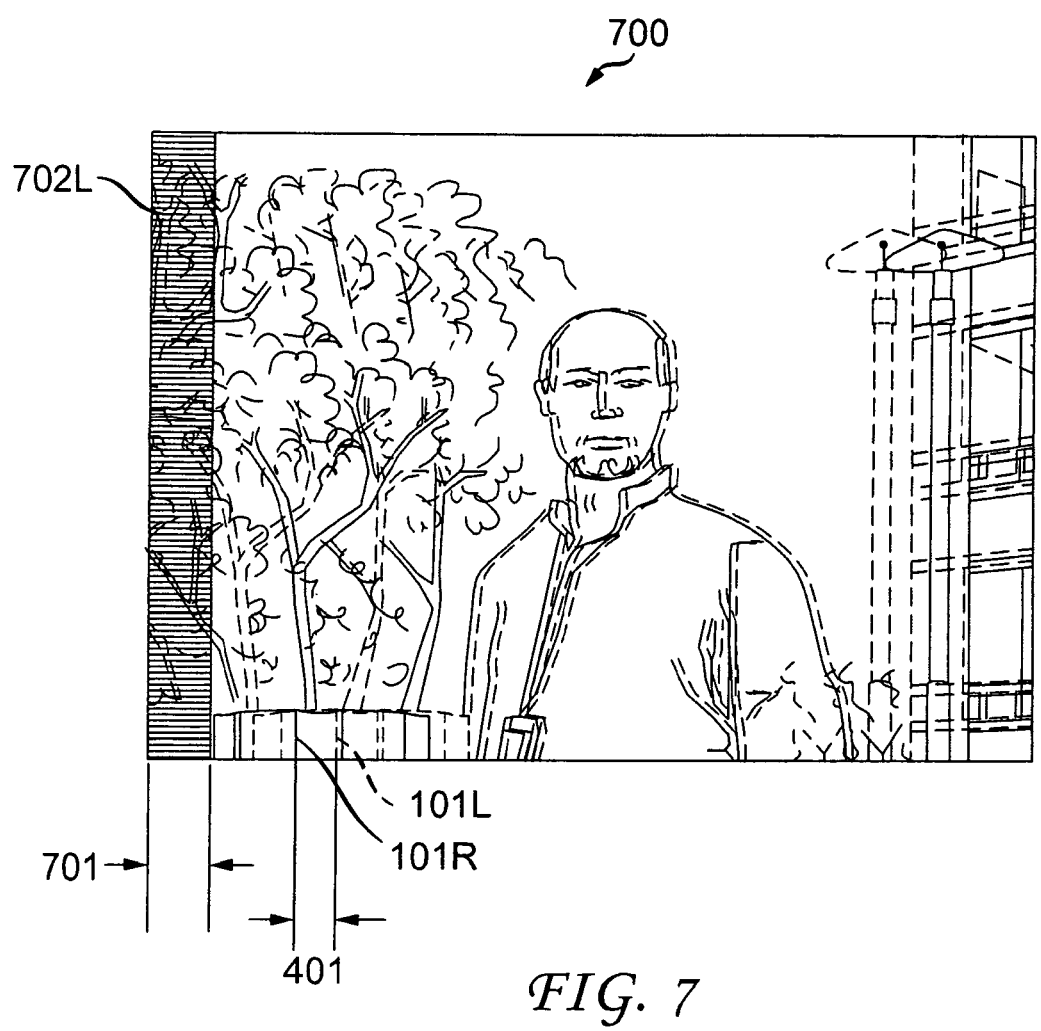
FIG. 7 shows a stereoscopic image pair with a floating edge imposed.

In FIG. 7, a floating edge has been added at the left edge of stereoscopic image 700, comprising black region 702L only in the left-eye image of stereoscopic image 700. Black region 702L has width 701, which is at least equal to the disparity 401 of foreground object (rook) 101. In actual practice, for a left edge floating window, the disparity 401 (here measured between the right- and left-eye images 101R and 101L of one of the rook's merlons) of the foreground object is preferably measured closer to the left edge of the object, but for clarity, the foremost measurement point (i.e., the point farthest in front of the screen) of rook 101 is shown here.

Figure 8:
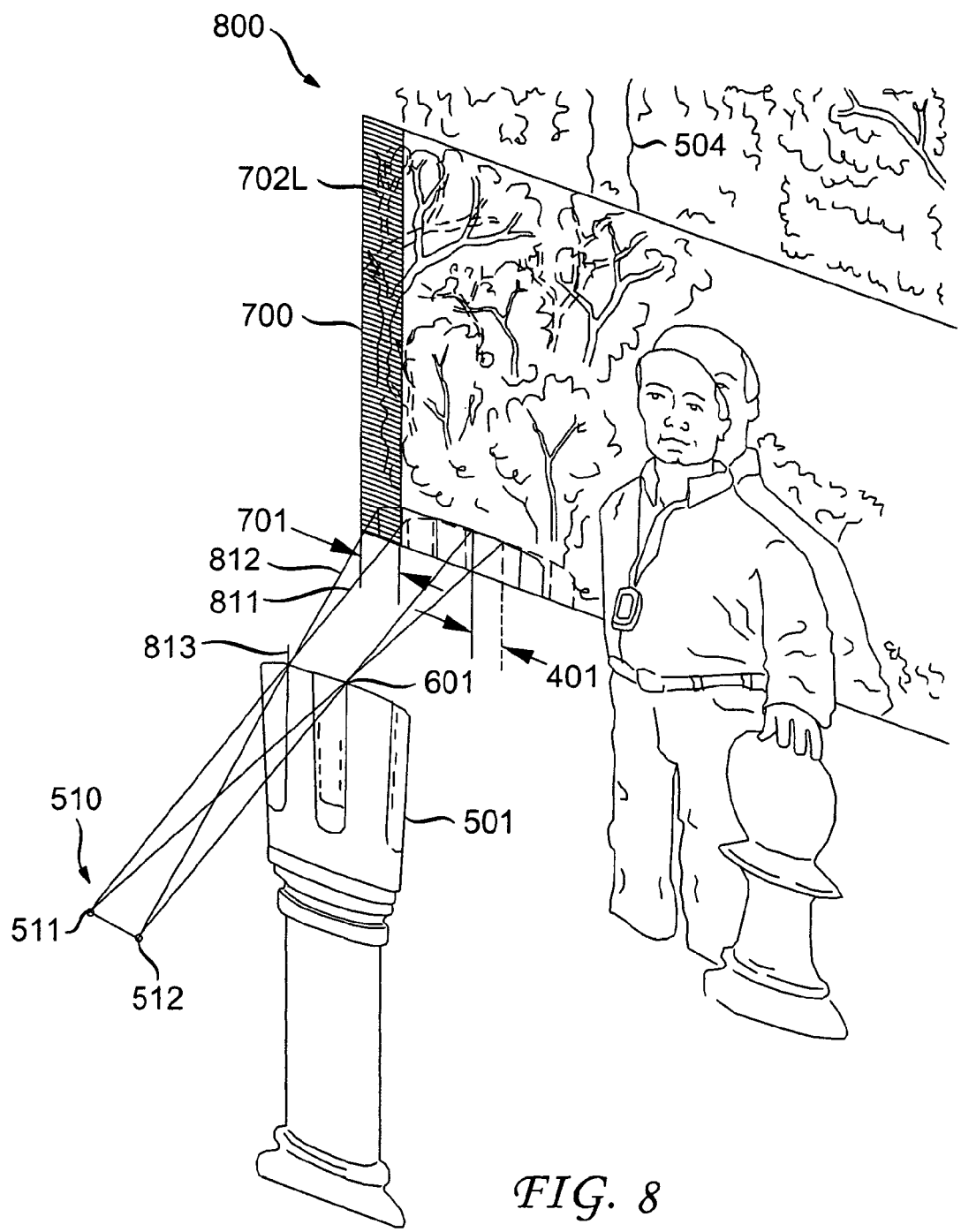
FIG. 8 shows an imaginary view showing how a floating edge resolves a visual depth conflict.

FIG. 8 shows the resulting imaginary view 800 with the left floating edge 702L. Now, instead of the left edge of image 700 appearing to be at screen edge 610, viewer 510 perceives the left edge of stereoscopic image 700 to be located at edge line 813, having a depth at or in front of rook image 501 (noting that rook image 501 would not be seen to the left of edge line 813). Since the perceived edge of the image at edge line 813 appears both to obscure rook image 501 and has a stereoscopic disparity no greater than that of rook image 501 (and is thus at rook image 501 or closer to viewer 510), the depth cue conflict has been resolved.

The addition of one or more floating edges or windows, for example, as with black region 702L, can be accomplished at the time of content preparation for the content comprising stereoscopic image 500, so that when it is delivered to a motion picture theatre (whether on film or as digital files), or is broadcast or otherwise delivered to a viewer's home display, e.g., via streaming video or on DVD, the floating windows are already present.

In a different embodiment, at the time of content preparation, the floating edge is not rendered (e.g., as with stereoscopic image 400 in FIG. 4 having no black area 702L), but instead, metadata is provided for specifying the width 701 of the black region 702L to be added dynamically to the left edge of the left-eye image. The dynamic provision of the black region(s) forming the left and/or right floating edges (if any) can be accomplished, for example, by a digital cinema server, the corresponding digital cinema projector, a DVD player, a set-top box, computer, or 3D-aware video display. The modification can be made in real-time, or the content altered in advance.

In still another embodiment, metadata is used to describe at least the disparity (e.g., 401) of the foremost foreground object (e.g., rook 101), if any, for each of the left and right edges. Additional metadata may be included to refine this information, for example, a partial disparity map providing disparity in the vicinity of the right and left edges; or a simplified disparity map, providing the minimum disparity in a low resolution grid covering at least the regions near the right and left edges.

In most theatres, the left- and right-side masking surrounding the projection screen obscures at least a portion of the projectable or viewable area of the projection screen. To allow the successful provision of floating edges in such a situation, the content must be specifically prepared so that the entirety of the image is projected inside the masking. Otherwise, a black region provided (such as the exemplary 702L) will have an apparently reduced width due to the theatre's masking, or be absent altogether, thereby resulting in an inadequately moved apparent image edge (where apparent image edge 613 was adequately moved forward, as in FIG. 6).

A similar detrimental effect is found in consumer video displays where a monitor (or DVD player, or set-top box) fails to display the entire stereoscopic image, but instead, displays only a portion. This frequently occurs if the aspect ratio of the content does not match the aspect ratio of the display, and the image is cropped and/or scaled so that the display is filled. For example, content produced for a high-definition 16:9 aspect ratio may be shown on a standard definition 4:3 aspect ratio monitor. One way of doing this (known as "letterbox") is to inset a scaled down 16:9 aspect ratio image into the 4:3 display area, leaving horizontal black areas at the top and bottom of the screen. However, some consumer do not like the black areas and find them and the corresponding reduced resolution to be objectionable. In addressing this objection, the high-definition is less scaled down, to just fill the screen from top to bottom, but the left and right sides are cropped to fit the 4:3 aspect ratio. In this case, both the left and right edges of the stereoscopic image are cropped. In some consumer displays, some interior subset of the image area (known as a "safe area") is the only portion displayed, for example the interior 90%, thereby discarding up to 5% off of each edge (sides, top, and bottom).

Figure 9:
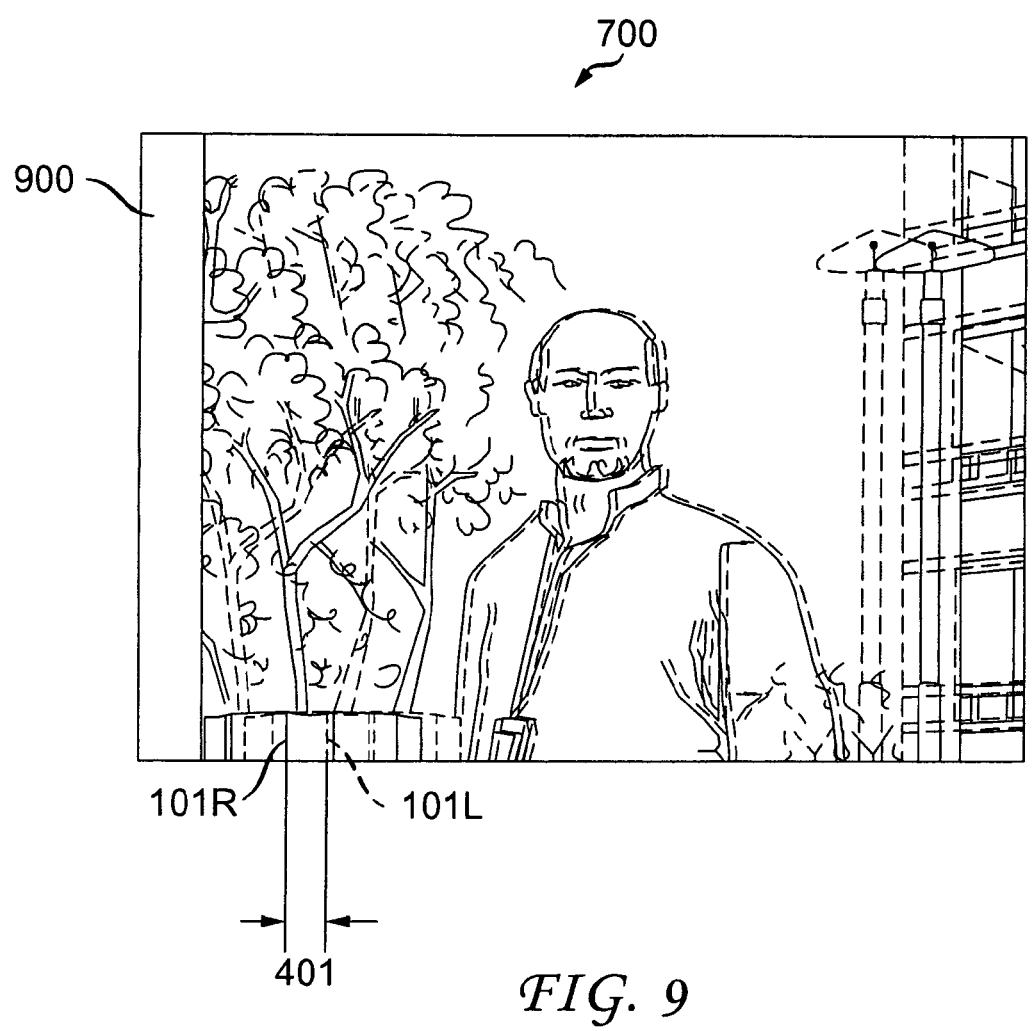
FIG. 9 shows a portion of a stereoscopic image being obscured, causing nullification of a floating edge.

FIG. 9 shows an obscured region 900 corresponding to a portion of stereoscopic image 700 (or image 400 in FIG. 4) being hidden, e.g., by theatrical side masking or cropping by a consumer video system. The previously-applied floating edge, i.e., black region 702L shown in FIG. 7, which may be studio-supplied as burned-in to the content or dynamically applied, is now all or partially hidden by the obscured region 900. Thus, the visual conflict concerning rook image 501 in FIG. 6 is essentially restored (although the visual conflict now arises at the right edge of obscured region 900, instead of at the left edge of the image 400 in FIG. 6).

Figure 10:
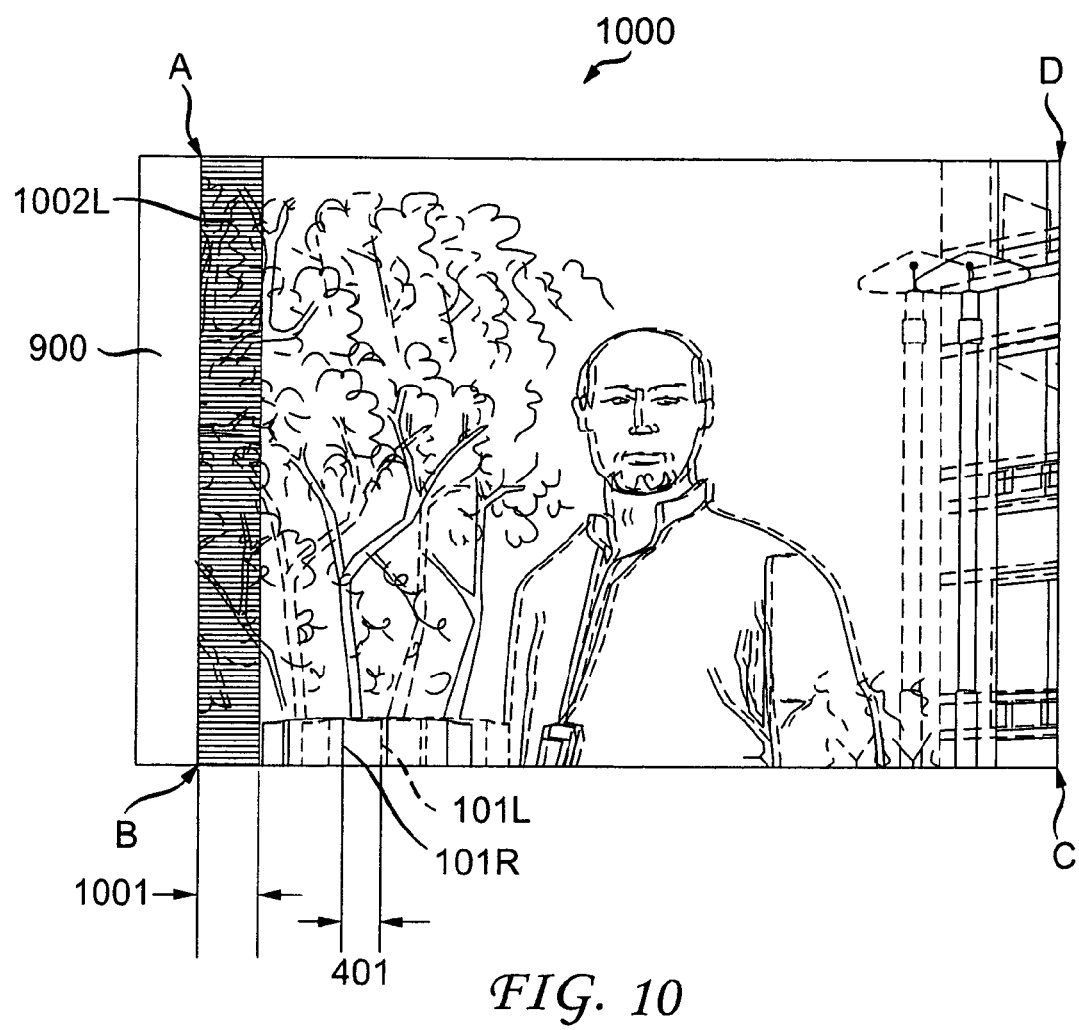
FIG. 10 shows a floating edge restored adjacent to the obscured region of FIG. 9.

One solution to this problem is shown in FIG. 10, in which modified stereoscopic presentation 1000 includes an extended floating edge located at the right edge of obscured region 900, shown as black area 1002L with a visible width 1001. Width 1001 is at least equal to the magnitude of the disparity of the foremost foreground object (if any) intersecting the right edge of obscured region 900, which, in this example, is at least equal to the magnitude of the disparity of the foremost portion of rook 101 at merlon image 101R and 101L. In another embodiment, it is possible to have a floating edge or blocked portion overlapping a region of the image such that at least a portion of the foreground object is also blocked. If the floating edge is sufficient to completely hide the foreground object from view, then there will no longer be any visual depth conflict.

Figure 11:
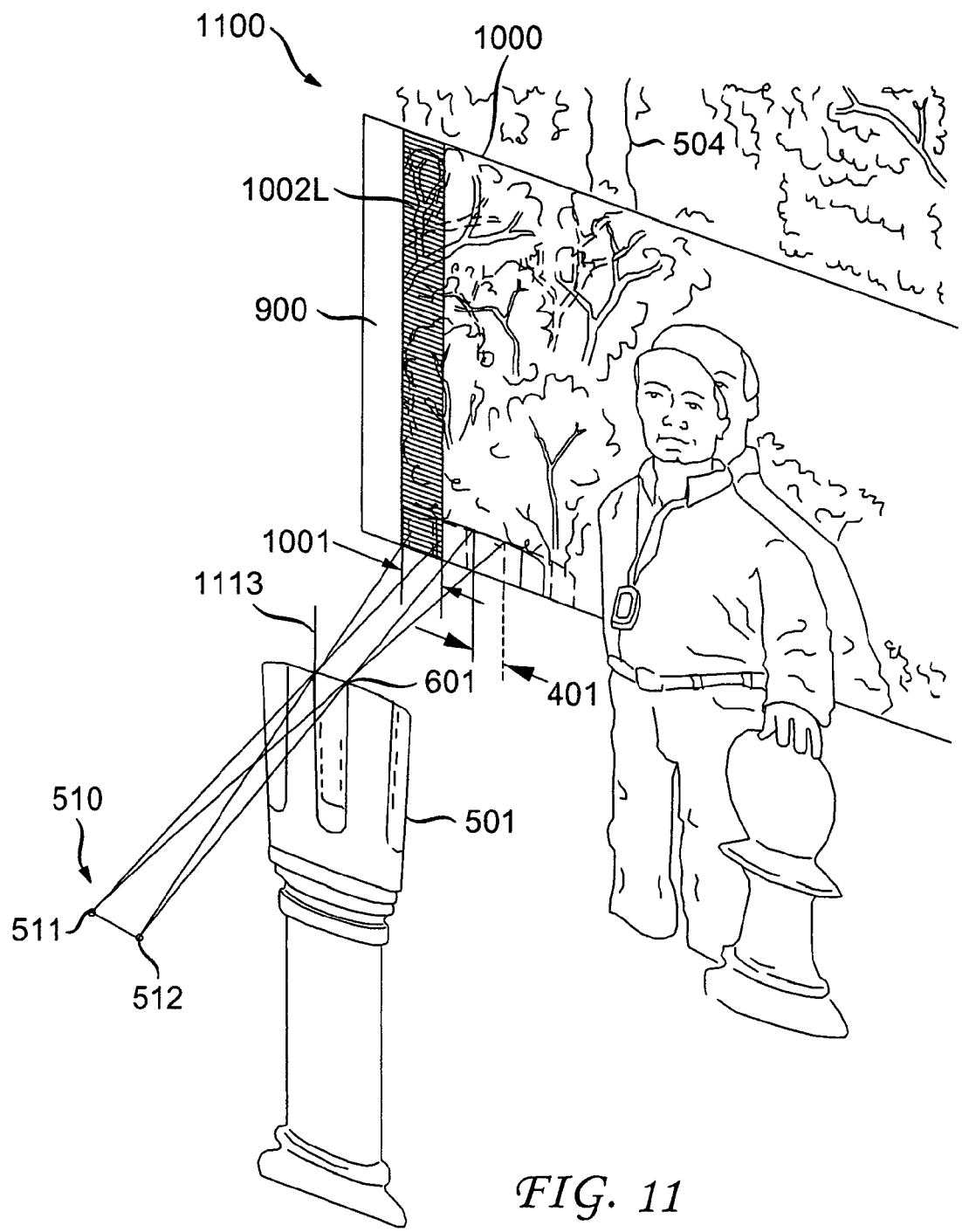
FIG. 11 shows an imaginary view showing how a restored floating edge resolves the visual depth conflict caused by the obscured region of FIG. 9.

FIG. 11 shows the resulting imaginary view 1100 in which the position of the left edge of image 1000 apparent to viewer 501 is indicated by edge line 1113, since the portion of rook image 501 to the left of edge line 1113 will not be seen by either eye 511, 512. In this case, the visual conflict is resolved by the presence of the floating edge 1002L, in which the apparent edge of the image 1000 at apparent edge line 1113 appears to both occlude rook image 501 and have a depth placement no further than that of rook image 501.

Figure 12:
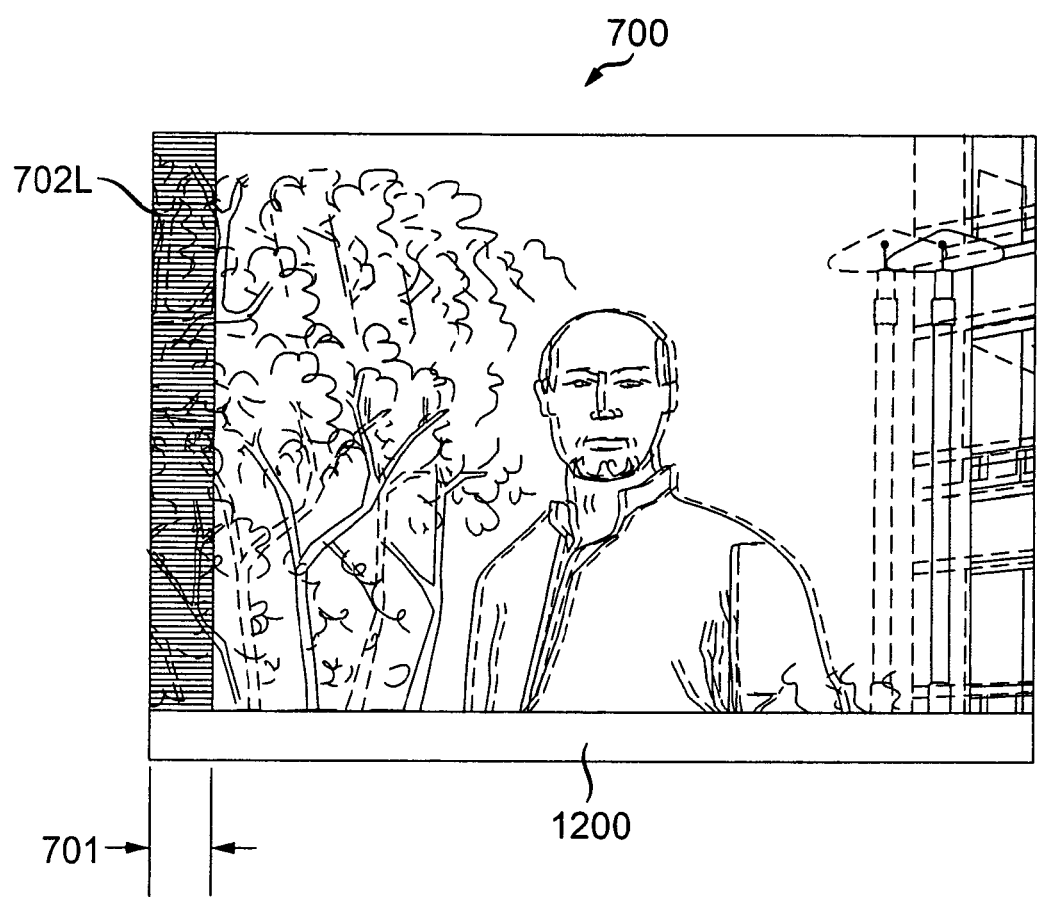
FIG. 12 shows a stereoscopic image with an obscured region that obviate the need of a floating edge.

FIG. 12 shows a different scenario, in which the left floating edge produced by black area 702L in the left-eye image of stereoscopic image 700 becomes superfluous when the foreground object (rook 101) that has an apparent depth conflict at the left edge is hidden by an obscured area 1200 at the bottom of the screen. In such a case, although the floating left edge does not introduce a visual conflict, it is preferable to reduce or remove the cropping of the left-eye image of the stereoscopic pair 700. For example, if the application of the black region 702L forming the floating edge is directed by metadata, instead of being burned-into the content of the stereoscopic image 700, then in FIG. 13, un-floating or removing the left floating edge would produce stereoscopic image 1300, which is substantially the same as stereoscopic image 400, but with obscured region 1200.

Alternatively, in another scenario, if obscured region 1200 and region 900 were both present in FIG. 9 (not shown), then nothing further would need to be done to the floating edge already in place (e.g., black region 702L). Since rook image 501 would be hidden by obscured region 1200, there would no longer be any depth conflict near the left edge of the screen, and thus, left floating edge, i.e., black region 702L (in FIG. 12), would become superfluous. Nothing needs to be done to the left floating edge 702L because it would be hidden by obscured region 900.

Figure 14:
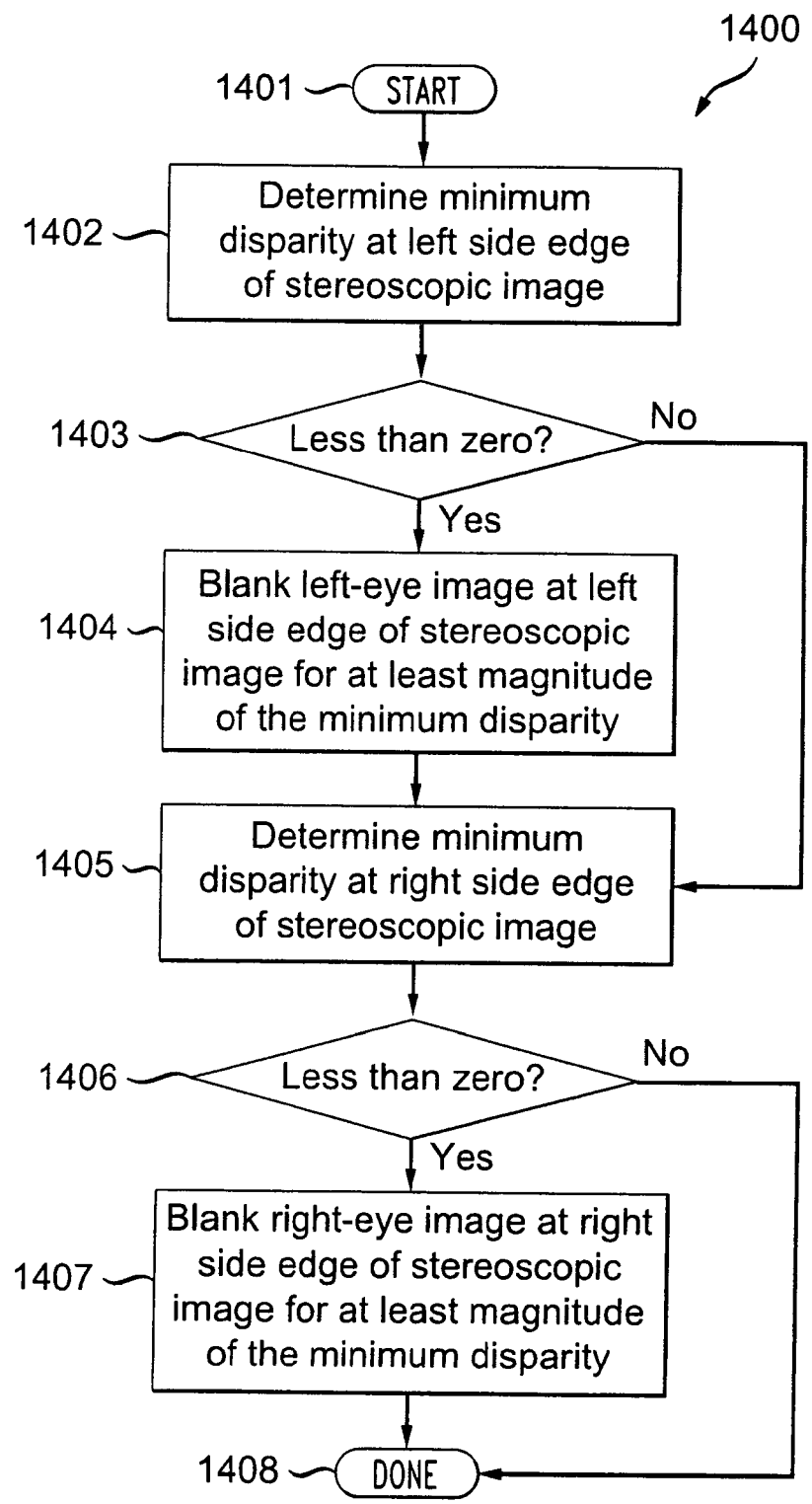
FIG. 14 shows a flowchart for one embodiment of automatic placement of a floating edge.

FIG. 14 is a flowchart for an automatic floating edge placement process 1400 to position left and/or right floating edges, if and as needed, in the corresponding left- and right-eye images of a stereoscopic pair, as shown in the examples of FIGS. 7 and 8. Process 1400, which is generally applicable to any stereoscopic presentation on different display systems, starts at step 1401, where a stereoscopic pair is provided without any floating edges. Metadata for use in preparing or applying floating edges (discussed below) may also be provided or derived as needed.

At step 1402, the minimum disparity appropriate to the left edge, or more generally, one of two opposing edges (i.e., left or right edge), of the left-eye stereoscopic image is automatically determined. The minimum disparity is determined for an object in the proximity of the left edge that appears closest to the viewer, or farthest in front of the screen. In this context, objects are considered in the proximity if they are located within a given or predetermined distance range from the edge of the screen such that the screen's edge would begin to have a detrimental effect on the apparent depth of the object (e.g., causing depth cue conflicts). This range of distance can be selected based on policy decisions, and can be specified as a certain number of pixels, e.g., 10 pixels, or other number of pixels away from the screen's edge, as appropriate. This procedure of determining minimum disparity for objects within a "proximity" region of the edge differs from the earlier scenario in which the need for a floating edge is based on an object being cropped or truncated by the edge. The policy or aesthetic decision to apply a floating window even though it is not absolutely necessary, i.e., using a less stringent criterion, may be preferable to not having a floating window when one should have been used. Note that it is normally not necessary, in determining the width of the floating edge, to take into account the distance of the object from the edge.

This disparity can be obtained in different ways. For example, it can be provided as metadata (e.g., as a minimum disparity of an object in proximity to the left edge), or be derived from metadata (e.g., as with a function for computing a disparity corresponding to the apparent depth of the foremost object in proximity to the left edge), or from a disparity or depth map for the region adjacent to the left edge (which could be searched at step 1402 to find the minimum), or by a disparity analysis of the left- and right-eye images. Disparity analysis can be performed using techniques such those taught by Zhang et al. in international published application, WO 2009/145749, entitled "System and Method for Depth Extraction of Images with Forward and Backward Depth Prediction," or by Zhang et al. in international patent application WO2009/061305 entitled "System and Method for Depth Map Extraction Using Region-Based Filtering", both having commonly assignment with this application. Contents of both PCT applications are herein incorporated by reference in their entirety.

Note that the minimum disparity determined for the left side edge can refer to a single minimum value suitable for the whole left edge from top to bottom (i.e., constant for the entire left edge), or it can refer to one or more values that vary along the edge. Since the magnitude of the minimum disparity will form the basis of the width of a floating edge to be applied, this also means that the floating edge can be provided as having a constant width along the entire edge based on the single minimum disparity value, or it can have varying widths at different locations along the left edge. Furthermore, the minimum disparity for the left edge can be discontinuous (e.g., having zero width at some points, and thus, leaving unobscured spans along the left edge), even to the extent that the blanking or blocking by the floating edge is established on a per-image-pixel-row basis, or to any coarseness in-between.

At step 1403, a check is made as to whether the minimum disparity determined at step 1402, i.e., either the constant minimum disparity along the entire left edge or the varying minimum disparity values at various locations along the edge, is less than zero. If not, i.e., the minimum disparity from step 1402 is greater than or equal to zero, step 1404 is skipped. Otherwise, at step 1404, a left floating edge is created by providing a black region that blocks the left-eye image at the left-side edge by a width of at least the magnitude of the minimum disparity determined at step 1402. This blocking can either be imposed directly into the content of the left-eye image, e.g. by burning black area 702L into the left-eye image, or it can be specified in metadata to be applied at a later time, e.g. by a digital cinema server, projector, or video set-top box, DVD player, personal computer, or handheld video player, e.g., a smart phone or other mobile devices.

At step 1405, the minimum disparity at the right side edge (or the edge opposite to that in step 1402) is likewise determined. At step 1406, if the minimum disparity found is greater than or equal to zero, then step 1407 is skipped. Otherwise, at step 1407, a right floating edge is created, in which the right-eye image is blocked at the right-side edge as previously described for the left eye image in step 1404.

Process 1400 concludes at step 1408, with the stereoscopic pair having zero, one, or two floating edges imposed, either burned into the content or as metadata defining the regions to be blanked or blocked before display.

To summarize, 3D presentation can be implemented by providing at least one floating edge in a stereoscopic image. The process involves determining a minimum disparity associated with an edge of at least one stereoscopic image (e.g., left edge for a left-eye image, and right edge for a right-eye image), and blocking off a region of that image, with the region having a width (measured from the corresponding edge of the image) at least equal to the magnitude of the determined minimum disparity. The minimum disparity associated with that edge is given by the disparity of an object in the image that is closest to a viewer (or farthest in front of the display), with the object being in the proximity of that edge, as defined by a predetermined distance range (established as a matter of policy), e.g., expressed in a number of pixels, −1, 0, or 10 pixels, which may be fractional, with a negative sign denoting a disparity for an object that appears in front of the screen. In the context of the present principles, only the minimum disparity of foreground objects (in front of the screen) is relevant to the application of the floating edge.

Note that the inward edge (or inside edge, closer to the center of the display) of the region(s) to be blanked or blocked may be smoothed (as opposed to saw-toothed or jagged), and the regions may be feathered to give a vignetted appearance. However, both in the case of smoothing and feathering, there should only be additional blanking in furtherance of that determined at step 1402 and step 1405, i.e., the smoothing and feathering should not result in any substantial portion of the to-be-blanked region becoming un-blanked, since this would reintroduce the visual contradiction the process seeks to eliminate. The use of feathering, jagged inside edge or other similar variations for the floating edge is directed towards achieving different stylistic or aesthetic effects, although the primary purpose remains the same—that of avoiding conflicting depth cues of a foreground object being hidden by a screen-plane edge.

Figure 15:
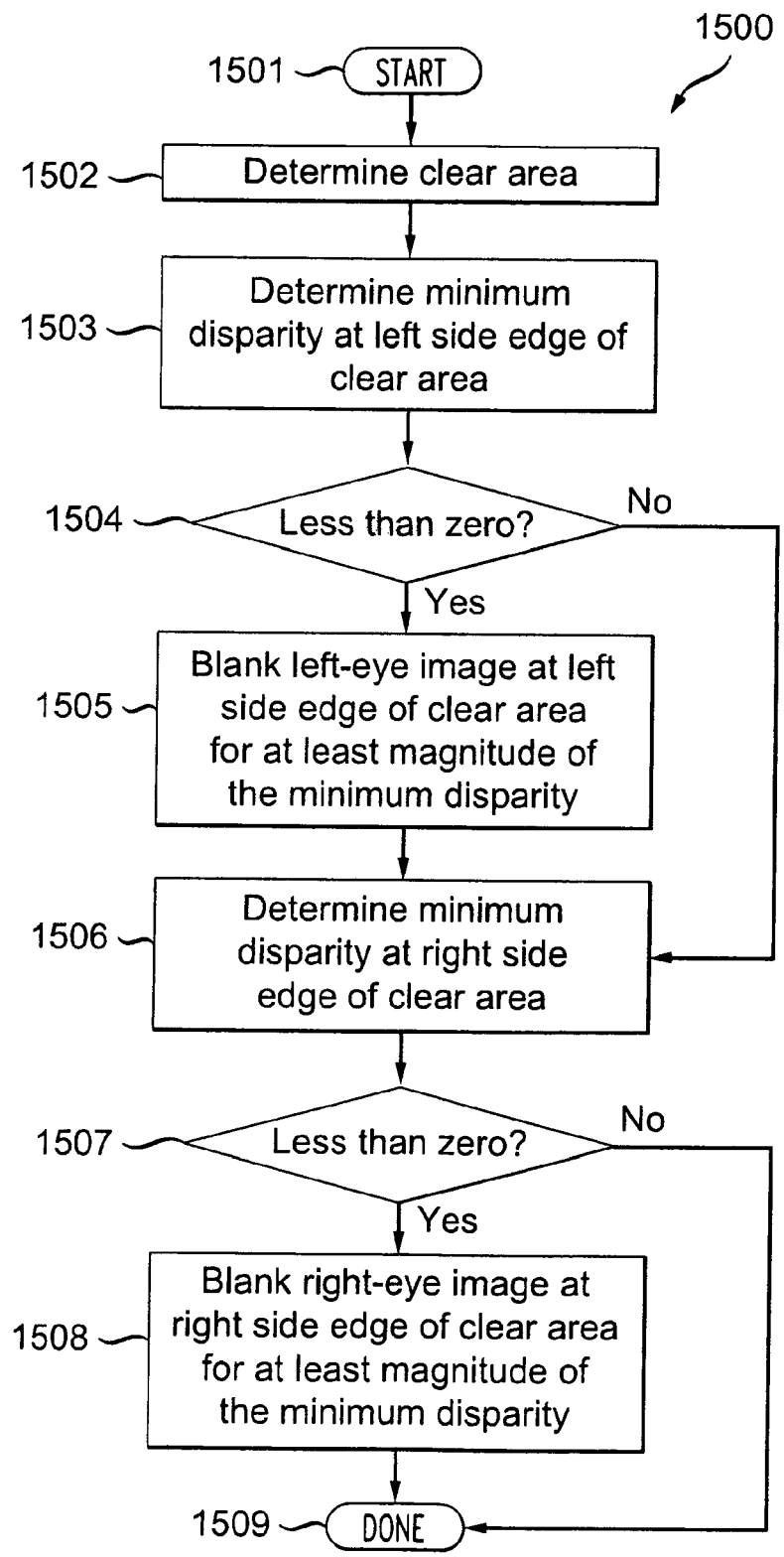
FIG. 15 shows a flowchart for another embodiment of automatic placement of a floating edge.

FIG. 15 shows a flowchart for a process 1500 that provides automatic or dynamic floating edge positioning, as shown in the examples of FIGS. 10 and 11. Unlike the process 1400, which implements floating edge under an assumption that the entire image will be viewable, process 1500 provides floating edges by taking into account any image masking or cropping by the display system. Process 1500 starts at step 1501, where a stereoscopic image pair is provided. The stereoscopic pair may optionally already have floating edges burned in or provided as metadata. Additional metadata (e.g., including disparity information, as discussed above) may also be provided or derived as needed.

At step 1502, a clear area of the presentation screen is determined, for example, as taught by Redmann in published patent application, WO 2010/096030, entitled "Method and Apparatus for Preparing Subtitles for Display." The "clear area" has a corresponding portion in image space, i.e., the portion of a left or right image that will be viewable on the screen without being obscured by masking or cropping by monitor electronics. In the example of FIG. 10, the clear area of the screen is portion ABCD. An example of a calibration procedure for determining the clear area involves projecting a coordinate grid on a screen and noting the outermost coordinates that can be observed closest to the corners of the screen. The region interior to these corner coordinates would define the region of the projected image area that is clear, while the region exterior to these corner coordinates will be obscured from view. Generally, the calibration can be conducted for either eye in a stereoscopic mode of operation, or in 2D, by disabling the stereoscopic operation.

In some cases, the clear area may be predetermined, whether by prior measurement, or by identification of one or more common obscurations. This would be especially true with professional or consumer video monitors, but not very likely with projection systems. For example, any monitor having a 4:3 aspect ratio that presents high-definition 16:9 content without using a letterbox format, centered, and without additional cropping in the vertical direction, would have well defined obscured regions on the left and right edges. If such displays were defined as having a common class, then all displays of that class would exhibit a common, well-defined clear area. For such a case, the clear area can be determined based on the display being a member of a certain class or type of displays, or by reference to a lookup table indexed by the model number of the display, or by having the clear area automatically reported by the display as metadata or derivable from other metadata provided (e.g., native resolutions, for example as provided in the Enhanced Extended Display Identification Data as standardized by the Video Electronics Standards Association). In some embodiments, the decision whether to scale and/or crop an image for display, maybe made at a set-top box or other video source, which then feeds the monitor at a native video rate in a native aspect ratio that may differ from that of the content. In this case, such predetermination of the clear area is made from the policies or preference settings of the video source.

At step 1503, the minimum disparity along the left edge of the clear area is determined, e.g., based on an object in the proximity of the left edge that has the smallest disparity (i.e., farthest in front of the display). Similar to step 1402 in process 1400, the minimum disparity can be determined as a single minimum value determined from top to bottom along the left edge of the clear area, or be determined at a plurality of regions or points along the left edge of the clear area, as fine an interval as for each pixel row of the image.

At step 1504, if all of the disparities found are greater than or equal to zero, then step 1505 is skipped. Otherwise, at step 1505, a floating edge or window having a certain width is applied to the left-eye image so that the portion of the image is blocked. The width of the floating window is measured from the point corresponding to the left edge of the clear area (e.g., right edge AB of mask region 900 in FIG. 10) to a width equal to at least the magnitude of the minimum disparity found. Referring to FIG. 10, the floating window (black region) 1002L has a width 1001 that is at least equal to the disparity 401, Although the width of the floating window can also extend all the way to the left edge of the left-eye image, that portion of the floating window hidden by the mask region 900 is unnecessary.

In other words, if at step 1504, the minimum disparity of objects proximate the left edge is found to be negative, then at step 1505, the left-eye image is blocked or blanked off by a floating edge applied at the left edge of the clear area. The inner bound or inside limit of this blocked-off region (1002L in FIGS. 10-11) is determined based on the minimum disparity, and in this case, is located to the right of the clear area's left edge, at a distance equal to the magnitude of the minimum disparity. The left-eye image can be blocked off by region 1002L and possibly continuing to the left through region 900. Although it is sufficient to black out region 1002L because region 900 is obscured (in the example of FIG. 10), it may be desirable to further black out region 900, in case the measurement of the obscured region is not sufficiently precise. Alternatively, this blanking may be encoded as metadata, though given that this blanking is specific for a particular display for which the clear area was determined in step 1502, there may be no good reason to delay its application.

Likewise, the minimum disparity for an object in proximity of the right edge of the clear area is determined at step 1506. At step 1507, if the minimum disparity found is greater than or equal to zero, then step 1508 is skipped, and the process concludes at step 1509. Otherwise, at step 1508, the right-eye image is blanked from a point corresponding to the right edge of the clear area towards a center portion of the image, to the extent of the magnitude of the minimum disparity (disparities) found in step 1506, and optionally, to the right edge of the right-eye image (analogous to the scenario for the obscured region 900 in FIG. 10). As in step 1505, this blocking or addition of the floating edge may alternatively be encoded as metadata. Note that steps 1506, 1507 and 1508 essentially repeat the same operations as in steps 1503, 1504 and 1505, except that steps 1506, 1507 and 1508 are performed on a different edge (right vs. left edge) of the clear area with the blank off region applied to the other stereoscopic image (right-eye vs. left-eye image).

Process 1500 concludes at step 1509, with the stereoscopic pair having zero, one, or two floating edges imposed inside the clear area determined at step 1502, either burned into the content or as metadata defining the regions to be blanked before display.

The advantage of having distinct processes 1400 and 1500 is that for simple displays or systems that are not configured to perform process 1500 or to obscure portions of the image, the content provided by process 1400 is ready to use (especially if the black regions, e.g., 702L, are burned into the content). However, a presentation system (e.g., a set-top box and/or monitor, or a digital cinema server and/or digital cinema projector, among others), savvy to its own clear area, may further apply process 1500, thereby providing automatic compensation when a floating edge provided in the content (or with the content, as metadata) by process 1400 is compromised by obscured areas (e.g., 900) known to the presentation system.

Figure 13:
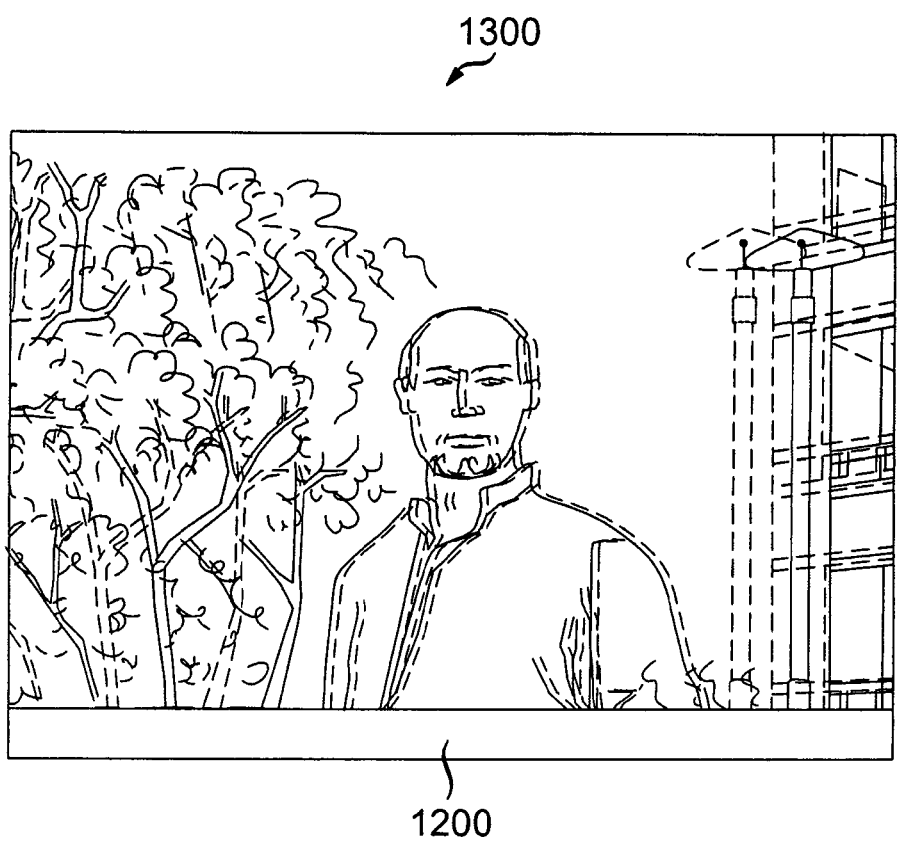
FIG. 13 shows the stereoscopic image of FIG. 12 with the floating edge removed.
Figure 16:
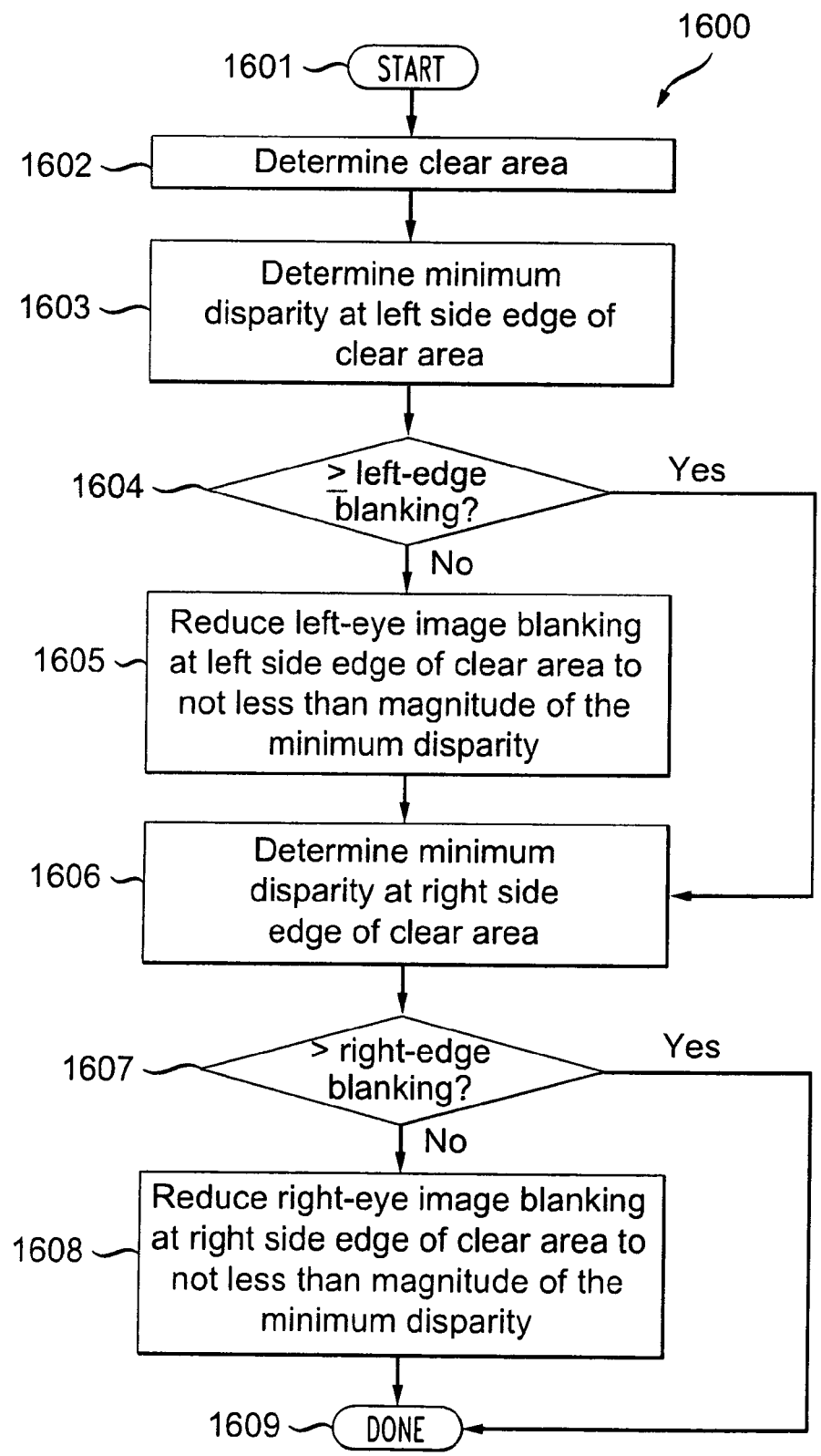
FIG. 16 shows a flowchart for another embodiment of automatic adjustment of a floating edge.

FIG. 16 shows a flowchart for automatic floating edge adjustment process 1600, which implements the dynamic floating edge reductions as shown in the examples of FIGS. 12 and 13. Here, process 1600 starts at step 1601, where a stereoscopic pair is already provided with metadata relating to positioning of floating edges. Additional metadata (as discussed above) may also be provided or derived as needed.

At step 1602, the clear area for a display is determined, as described for step 1502 in process 1500. At step 1603, the minimum disparity associated with the left edge of the clear area is determined, as previously described. Note that an obscured area (e.g., area 1200 in FIG. 12 or 13) may result in all or a portion of a foreground object (e.g., rook 101 in FIG. 10) being hidden from the visible portion of the display.

At step 1604, a comparison is made between the minimum disparity determined in step 1603 (but with disparity for background objects clamped to zero) and the width of the left edge blanking portion prescribed by metadata. If the magnitude of the lesser of the minimum disparity and zero is greater than or equal to the width of the blanked-out portion prescribed for the left edge by the metadata, then step 1605 is skipped, so that the blanked-out portion provided by the metadata will not be reduced. Otherwise, if the magnitude of the lesser of the minimum disparity and zero is less than the width of the blocked-off portion prescribed at the left edge, then at step 1605, the width of the blocked off portion for the left edge can be reduced, but only to an amount equal to or greater than the absolute value of the lesser of the minimum disparity and zero. Recall that zero disparity would be at the screen surface, any disparity 'greater' than that is behind the screen—beyond the reach of floating windows. Disparity 'less' than zero (negative) is forward of the screen, and may potentially interact with a floating window. The result is that if the closest object in the image proximate the edge is behind the screen, then the floating window gets reduced to zero (the lesser of zero and the positive disparity), however, if the closest thing at the edge is in front of the screen, then the floating edge gets set to that disparity (or absolute value of it) or slightly wider.

The procedures in steps 1603, 1604 and 1605 are repeated for the other eye's image. Thus, at step 1606, the minimum disparity associated with the right edge of the clear area is determined, and at step 1607, compared with the value prescribed by metadata. If appropriate, the blanking prescribed for the right-eye image at the right edge is reduced in step 1608.

The process 1600 completes at step 1609 with the potentially reduced prescription for the left and right edge blanking which may either be passed onward toward the display (e.g., a monitor or projector) as metadata descriptions, or the blanking may be burned into the content as zero (i.e., no region that needs to be blanked) or more black regions, each applied to one or the other of the left- and right-eye images of the stereoscopic content.

Although FIGS. 14-16 show that the minimum disparity is determined for the left side edge of a stereoscopic image or clear area before the right side edge (e.g., step 1402 performed before step 1405), these process steps can also be performed first for the right side edge and then for the left side edge.

Floating edge reduction process 1600 suggests that it may be more advantageous to use metadata to provide a floating edge from process 1400 compared to burning the corresponding black region(s) into the stereoscopic content. The metadata approach provides more flexibility, since this allows a savvy or smart display system to reduce or eliminate the cropping associated with a floating edge if it is determined that a floating edge is too large, or altogether unnecessary (e.g., as with the presence of an obscured region such as 1200). Such a reduction or elimination of cropping is not easily performed if the underlying content has a burned-in black region.

Note that for clarity of explanation, the following detail is omitted from both the above description at steps 1604, 1605, 1607, and 1608, and from FIGS. 12-13. If the clear area is bound on a side by an obscured region, for example region 900, then the width of that obscured region must be added to the lesser of the minimum disparity and zero before the comparison with the prescribed blanking width at step 1604 or 1607 and conditional reduction at step 1605 or 1608. In other words, if the "blanking" is defined from the edge of the image to the opposite edge of the region (like 1002L in FIG. 11), then the width of the blanking is the width of 1002L plus the width of region 900.

The processes 1400, 1500, and 1600 are expected to be most commonly applied to a sequence of stereoscopic images. In such a scenario, the position and disparity of foreground objects near either edge may change from frame to frame, for example, as a character or object enters or leaves the scene. To avoid having a floating edge expand or contract suddenly (other than at a scene change) or jitter or modulate continuously, the width of the minimum disparity in steps 1402, 1405, 1503, 1506, 1603, 1606, or the resulting blanking width burned into the content or recorded as metadata in steps 1404, 1407, 1505, 1508, 1605, or 1608 may be smoothed or otherwise filtered (including looking ahead to later stereoscopic images in the sequence) to anticipate such changes and minimize unnecessary changes that would otherwise call attention to the changing floating edge(s).

To summarize, the present embodiments have been presented as being applicable to automatically apply or modify the floating edge(s) of 3D stereoscopic images having foreground objects that may otherwise produce depth conflict at the edge of the image space. Some of these methods are applicable for initially generating a floating edge for presentation, while others are used to correct for or adjust floating edges that have been provided with the content (as prescribed by metadata), e.g., due to the presence of a partially obscured display screen.

Figure 17:
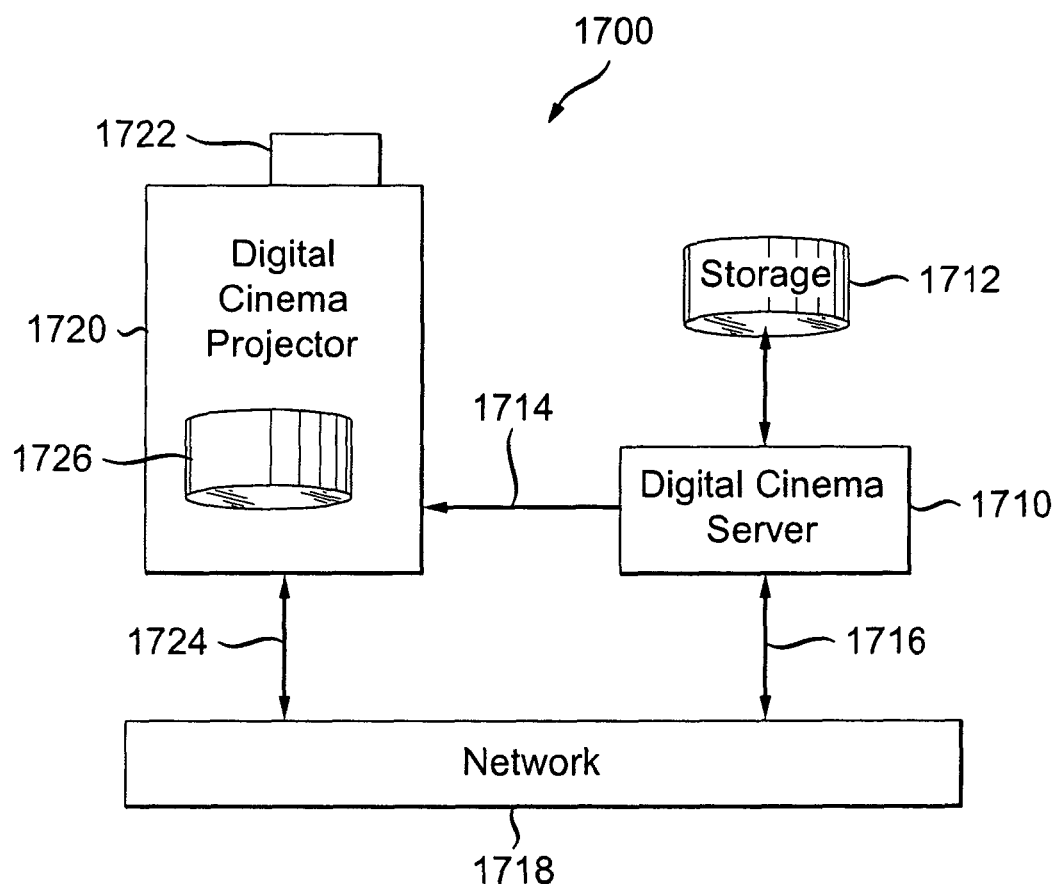
FIG. 17 shows one embodiment of a system for implementing methods of the present principles.

FIG. 17 depicts a block diagram illustrating one implementation of the present invention. Digital cinema system 1700 includes a digital cinema server 1710 and a digital cinema projector 1720 suitable for presenting stereoscopic images. Digital cinema server 1710, which has at least read access to a storage device 1712, is configured for reading a composition from storage device 1712 and decoding stereoscopic picture and audio essence. Picture essence (which may have one or more floating edges burned-in), and if applicable, metadata relating to floating edges are provided to digital cinema projector 1720 over connection 1714, which may be a one-way or two-way communication path. Digital cinema projector 1720 generates a stereoscopic image from the stereoscopic picture essence and projects the resulting images through lens 1722 onto a screen (not shown) in auditorium. Audio essence is provided by digital cinema server 1710 to an audio reproduction chain (not shown), which delivers the audio component associated with or accompanying the stereoscopic picture essence to the audience in the auditorium.

In the present invention, if the screen has any obscured regions, e.g., due to masking, a processor (e.g., in the projector 1720) can execute program instructions (e.g., stored in storage 1726) for implementing process such as process 1500 or 1600, to determine if any floating edges should be applied, or adjusted from those prescribed by metadata, for one or both of the stereoscopic images.

In an alternative embodiment, the adjustment of the floating edges for the stereoscopic image may be performed by digital cinema server 1710 and provided to projector 1720, ready to be displayed.

In still another embodiment (not shown), suitable for use in a home, a set-top box or DVD player may perform the adjustment of floating edges with the stereoscopic images for display on a 3D-capable monitor (i.e., one capable of displaying stereoscopic images). Alternatively, the adjustment of floating edges for the stereoscopic image may be wholly performed by a computer within the 3D-capable monitor.

Although specific examples have been presented above, other variations can be used to implement one or more features of the present principles. For example, instead of defining a floating edge based on the minimum disparity in a region proximate an edge of a display, apparent depth can be used in place of the minimum disparity. Thus, a method can include determining an apparent depth of an object in a region of a stereoscopic image proximate an edge of an image display area, and blocking a portion of the stereoscopic image from being displayed, with the portion's width being selected based on the apparent depth of the object.

In another embodiment, information relating to a floating edge can be stored in memory of a display system, and retrieved prior to a stereoscopic presentation. The floating edge can then be applied based on the retrieved information for blocking certain portion of a stereoscopic image.

Another embodiment can provide for the minimum disparity information to be obtained by identifying a plurality of pixels in the region of a stereoscopic image, and determining the minimum disparity for that region by comparing disparities associated with the plurality of pixels in the region of the stereoscopic image.

One aspect of the invention also provides a computer readable medium (e.g., memory, storage device, removable media, and so on) with specific program instructions stored thereon which, when the instructions are executed by one or more processors, will cause a method to be implemented such as described above according to embodiments of the present principles.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for use in presentation of stereoscopic content, comprising:
obtaining data regarding a first stereoscopic image to be displayed;
determining if the first stereoscopic image is to be obscured by any region;
obtaining a minimum disparity associated with a region of the first stereoscopic image, the region being proximate to the obscured region of the first stereoscopic image;
defining a portion of the first stereoscopic image adjacent to the obscured region in accordance with the minimum disparity; and
displaying the first stereoscopic image while blocking the defined portion from being displayed using a floating window comprising a black region; wherein the floating window having varying widths at different image pixel rows along one of its edges.

2. The method of claim 1, wherein the minimum disparity is obtained based on one of: metadata provided with the stereoscopic content, derivation from a disparity map of the region, and a disparity analysis of the first stereoscopic image and a second stereoscopic image, wherein the first and second stereoscopic images form a stereoscopic image pair.

3. The method of claim 2, wherein each disparity represents an offset between a pixel of the first stereoscopic image and a corresponding pixel of the second stereoscopic image.

4. The method of claim 1, wherein the blocked portion has a width at least equal to a magnitude of the minimum disparity.

5. The method of claim 1, wherein the blocked portion of the first stereoscopic image is at least one of: a left portion of a left-eye image and a right portion of a right-eye image.

6. The method of claim 5, wherein the left portion extends at least from one of: a vertical left edge of the left-eye image and a vertical left edge of an image display area, towards a center portion of the left-eye image.

7. The method of claim 5, wherein the right portion extends at least from one of: a vertical right edge of the right-eye image and a vertical right edge of an image display area, towards a center portion of the right-eye image.

8. The method of claim 1, further comprising:
prior to displaying the first stereoscopic image, storing information relating to the defined portion;
retrieving the stored information; and
blocking the defined portion of the first stereoscopic image based on the retrieved information during display of the first stereoscopic image.

9. The method of claim 1, further comprising:
identifying a plurality of pixels in the region of the first stereoscopic image; and
determining the minimum disparity by comparing disparities associated with the plurality of pixels in the region of the first stereoscopic image.

10. A method for use in stereoscopic display, comprising:
determining an apparent depth of an object in a stereoscopic image, the object being proximate to an obscured region of the stereoscopic image; and
blocking a portion of the stereoscopic image from being displayed using a floating window comprising a black region, the portion having a width selected based on the apparent depth of the object and wherein the blocking is provided on one side of a stereoscopic image while an opposite side is not obscured; and wherein the floating window having varying widths at different image pixel rows along one of its edges.

11. A system for presenting stereoscopic content, comprising;
at least one processor configured for determining a minimum disparity associated with a region of a first stereoscopic image, the region being proximate to an obscured region of the first stereoscopic image; wherein the minimum disparity is determined for an object in the proximity of a first vertical edge; said processor defining a portion of the first stereoscopic image adjacent to the obscured region in accordance with the minimum disparity, and blocking the defined portion during display of the first stereoscopic image using a floating window comprising a black region; and wherein the floating window having varying widths at different image pixel rows along one of its edges.

12. The system of claim 11, wherein the at least one processor is further configured for determining the minimum disparity based on one of: metadata provided with the stereoscopic content, derivation from a disparity map of the region, and a disparity analysis of the first stereoscopic image and a second stereoscopic image, wherein the first and second stereoscopic images form a stereoscopic image pair.

13. The system of claim 11, wherein the region of the first stereoscopic image is proximate one of: a vertical edge of the first stereoscopic image and a vertical edge of an area for displaying the first image.

14. The system of claim 11, wherein the blocked portion has a width at least equal to a magnitude of the minimum disparity.

15. The system of claim 11, wherein the blocked portion of the first stereoscopic image is at least one of: a left portion of a left-eye image and a right portion of a right-eye image.

16. The system of claim 11, wherein the at least one processor is provided in one of: a digital cinema display system and a consumer video display system.

17. The system of claim 11, wherein the at least one processor is provided in at least one of a digital video player, a set-top box and a mobile device.

18. The method of claim 1, wherein the region of the first stereoscopic image is proximate one of: a vertical edge of the first stereoscopic image and a vertical edge of an area for displaying the first stereoscopic image.

* * * * *